: 3,759,824
METHOD FOR DETERMINING DECREASE IN HYDROGENATION-DEHYDROGENATION ACTIVITY AND ACIDIC ACTIVITY OF REFORMING CATALYST

Marvin F. L. Johnson, Homewood, Ill., assignor to Atlantic Richfield Company, New York, N.Y.
No Drawing. Filed Sept. 20, 1971, Ser. No. 182,152
Int. Cl. C10g 35/06
U.S. Cl. 208—139                                                                 20 Claims

ABSTRACT OF THE DISCLOSURE

A method for monitoring the hydrogenation-dehydrogenation and/or acidic activities of a catalyst comprising platinum and alumina is disclosed. The catalyst is used to promote the conversion, e.g., reforming, of hydrocarbon feedstock into hydrocarbon effluent. The effluent can then be analyzed for toluene and methylcyclohexane (MCH), and n-hexane, 2,2-dimethylbutane, n-heptane and 3,3-dimethylpentane. Selected ratios of these six components characterize the state of the activity of the catalyst.

---

This invention relates to a method for determining catalytic activity. More particularly, the invention relates to a method for determining decreases in the hydrogenation-dehydrogenation and/or acidic activities of platinum-alumina catalysts used in the chemical conversion of hydrocarbon fractions to useful products.

Catalysts which comprise platinum and alumina are useful to promote the chemical conversion of hydrocarbons, such as in catalytic reforming, which is widely used in the petroleum industry for the production of improved fuels. These catalysts have both hydrogenation-dehydrogenations and acidic catalytic activities. Both of these catalytic activity components are utilized, for example, in a hydrocarbon reforming process where a platinum-alumina catalyst is used to promote the conversion of low octane number compounds to higher octane material and thus aid in the production of improved fuels, such as gasoline. It is well known that the platinum-alumina catalysts which are used to promote these reactions become deactivated after a period of time in service, so that ultimately these catalysts must be regenerated or replaced. As a result of catalyst deactivation, caused, for example, by the deposition of carbonaceous material on the catalyst, the reaction conditions, especially temperature, must be made more severe in order to maintain the octane number of the gasoline-range (i.e., material which can be blended into gasoline) reactor effluent at a constant level. The increased reaction severity, however, causes an increase in the rate of cracking reactions in which valuable gasoline-range molecules are converted to less valuable low-boiling material (e.g., methane, ethane, propane, butane and the like) and carbonaceous material which deposits on the catalyst and causes further catalyst deactivation.

Therefore, as the catalytic activity decreases, the yield of the desired high octane product also tends to decline. However, because the make-up of the hydrocarbon feedstock to a commercial catalytic reforming unit may be subject to wide variations, and also because of difficulties in obtaining representative samples for analysis it is often difficult to obtain consistent and reliable yield data from a commercial unit. Data correlations which have been developed to aid in characterizing catalytic activity depend, in part, on the accuracy of the yield data and are, therefore, only as consistent as these yield data. As a result, these yield data and correlations may not permit the hydrocarbon processor, e.g., petroleum refiner, to recognize decreases in catalytic activity until a severe loss in both yield and activity has occurred.

Therefore, one of the objects of the present invention is to provide an improved method for determining when a decrease in hydrogenation-dehydrogenation activity of a catalyst comprising platinum and alumina has occurred.

Another object of the present invention is to provide an improved method for determining when a decrease in catalyst acidic activity of a catalyst comprising platinum and alumina has occurred. Other objects and advantages will become apparent hereinafter.

It has now been discovered that ratios of certain components in the effluent from a reactor system utilizing a catalyst comprising platinum and alumina can serve to characterize the state of the hydrogenation-dehydrogenation and acidic activities of the catalyst and thus aid in determining activity decreases. The ratio of toluene to methylcyclohexane (MCH) in the reactor effluent when compared to a corresponding baseline ratio of these two components hereinafter defined, at the temperature and hydrogen partial pressurre exiting at the outlet of the reaction system, serve to characterize the state of the hydrogenation-dehydrogenation activity of the catalyst. Concentration ratios of certain paraffins in the reactor effluent when compared to the same ratios when the catalytic activity is acceptable serve to characterize the state of the acidic activity of the catalyst, provided that the catalyst has acceptable hydrogenation-dehydrogenation activity.

One aspect of the present invention is a method for determining a decrease in the hydrogenation-dehydrogenation activity of a catalyst comprising platinum and alumina. The hydrogenation-dehydrogenation activity of the platinum-alumina catalysts is generally attributed to one or more of the metallic components, e.g., platinum, of the catalyst. The method of the present invention is particularly useful where the catalyst is used in at least one reaction zone to catalyze the chemical conversion of hydrocarbon feedstock into a hydrocarbon effluent containing toluene and methylcyclohexane in the presence of hydrogen and at hydrocarbon conversion conditions. Specifically, the present method may be used in conventional hydrocarbon reforming operations where toluene and methylcyclohexane are present in the reformate (i.e., reactor effluent). The new method comprises:

(1) Analyzing the effluent from the reactor zone to determine the actual molar ratio of toluene to methylcyclohexane in said effluent;

(2) Determining an activity ratio, said activity ratio being the ratio of said actual ratio to the baseline molar concentration ratio of toluene to methylcyclohexane, as hereinafter defined, at the conditions of temperature and hydrogen partial pressure existing at the outlet of said reaction zone; and (3) Repeating steps (1) and (2) periodically until said activity ratio is determined to be less than about 1.7, said determination indicating a decrease in the hydrogenation-dehydrogenation activity of said catalyst.

In order to insure the accuracy of the conclusion of a decrease in the hydrogenation-dehydrogenation activity of the catalyst, it is preferred to repeat steps (1) and (2) until the activity ratio is less than about 1.3, more preferably less than about 1.0. When the value of the activity ratio indicates a decrease in hydrogenation-dehydrogenation activity, the catalyst may either be replaced or regenerated in order to again obtain aceptable hydrogenation-dehydrogenation catalytic activity.

Another aspect of the present invention is a method for determining a decrease in the acidic activity of a catalyst comprising platinum and alumina. The acidic activity of the platinum-alumina catalysts is generally attributed to the alumina component of the catalyst. However, other components, e.g., halogens, may be present in the reaction zone which may increase the acidic activity of the catalyst. This aspect of the invention is useful where the catalyst has acceptable hydrogenation-dehydrogenation activity and is used in at least one reaction zone to catalyze the chemical conversion of hydrocarbon feedstock into a hydrocarbon effluent, e.g., reformate from conventional hydrocarbon reforming, containing at least one set of paraffins selected from the group consisting of (A) n-hexane and 2,2-dimethylbutane and (B) n-heptane and 3,3-dimethylpentane in the presence of hydrogen and at hydrocarbon conversion conditions. This aspect of the present invention comprises:

(1) Analyzing the effluent from the reactor zone to enable the determination of a baseline isomer concentration ratio, the baseline isomer ratio being selected from the group consisting of n-hexane to 2,2-dimethylbutane and n-heptane to 3,3-dimethylpentane, provided that both of the components making up the ratio are present in the effluent;

(2) Analyzing the effluent from the reaction zone to enable determination of a current isomer concentration ratio (which is made up of the same components used to define the baseline isomer ratio in step (1); and (3) Repeating step (2) until the current isomer ratio is determined to be at least about 1.3 times the baseline isomer ratio, this determination indicating a decrease in the acidic activity of the catalyst.

In order to insure the accuracy of the conclusion of acidic catalytic activity decrease, it is preferred that step (2) be repeated until the current isomer ratio is at least about 1.5 times, more preferably, at least about 2.0 times, the baseline isomer ratio. When a decrease in acidic activity is indicated, it may be necessary to replace or regenerate the catalyst in order to achieve high acidic catalytic activity. In order to obtain the maximum benefits of the present invention, the baseline isomer ratio should be determined when the catalyst has a substantial portion of its start-of-the-catalyst-cycle acidic activity. Therefore, it is preferred that the baseline isomer ratio be determined within about one month, more preferably within about one week, of the start of the catalyst cycle. As used herein, the term "start-of-the-catalyst-cycle" refers to the time at which hydrocarbon is first processed in the presence of hydrogen at hydrocarbon conversion conditions such as those detailed herein in the reaction zone using virgin and/or regenerated catalyst.

The two aspects of the present invention described above may be used together to determine a decrease in the acidic activity of the catalyst provided that all the necessary components are present in the reaction zone effluent. For example, if the method of the present invention indicates the catalyst has an acceptable hydrogenation-dehydrogenation activity, i.e., an activity ratio of at least about 1.7, preferably at least about 1.3 and more preferably at least about 1.0, the present invention can be used to determine a decrease in the acidic activity of the catalyst. If the catalyst has acceptable hydrogenation-dehydrogenation activity but decreased acidic activity, one possible solution, well known to the art, may be to add at least one halogenated hydrocarbon such as carbon tetrachloride, methylchloride, trichloroethylene, ethylenedichloride and other decomposable halogen-containing compounds, with carbon tetrachloride being preferred, to the hydrocarbon feedstock to increase the acidic activity of the catalyst. Of course, if the method of the present invention indicates a decrease in either the hydrogenation-dehydrogenation activity or the acidic activity, it may be necessary to regenerate or replace the catalyst in order to obtain high catalytic activity.

Since the method of the present invention involves a determination of the ratio of amounts of certain components, rather than absolute amounts of components, only a partial analysis of the reactor effluent (i.e., analyzing only that part of the reactor effluent containing the components of interest in practicing the present method) is necessary. This is advantageous and, therefore, preferred because analyzing the entire reactor effluent is time consuming and increases the chances of analytical error. Of course, it is possible to proceed according to this method by analyzing the entire reactor effluent. The analysis of the reactor effluent can be carried out in any manner, e.g., gas chromatography, mass spectrometry, infra red spectrometry and the like, which will give the required component ratios. Because of the availability and cost of chromatographic equipment, analytical ease and time considerations, it is preferred that the effluent analyses required in the present method be done using gas chromatography. In essence, gas chromatography, as an analytical method, involves contacting a gas or liquid mixture to be analyzed with a material (usually in a column) which separates the components of the mixture and allows one to measure the concentration of each compound in the mixture. If the compounds are separated by boiling point, the concentrations of toluene, MCH, $C_6$ and $C_7$ paraffins (these compounds being low boiling relative to the remainder of the reformate) are determined quickly, thereby minimizing the analytical time required.

The present invention involves the determination of a toluene to methylcyclohexane baseline molar ratio at the conditions of temperature and hydrogen partial pressure existing at the outlet of the reaction zone. This baseline molar ratio of toluene to methylcyclohexane is defined by the following equation:

$$\log_{10}\left(\frac{\text{Toluene}}{\text{Methylcyclohexane}}\right) = 20.1896 - \frac{19064}{T}$$

$$-\frac{1.1954 \times 10^6}{T^2} + \frac{4.394 \times 10^8}{T^3} - 3 \log_{10} P_{H_2}$$

where $T$ is temperature in °Rankine and $P_{H_2}$ is the hydrogen partial pressure in atmospheres.

The method of the present invention is useful in conventional catalytic hydrocarbon reforming operations. In the normal reforming operation, hydrocarbon feedstock, e.g., naphtha, comprising a major proportion of naphthenes and paraffins is passed over a catalyst comprising platinum and alumina in at least one reaction zone at hydrocarbon reforming conditions in the presence of free or molecular hydrogen. Temperatures in the range from about 800° F. to about 1000° F. and pressures of about 150 p.s.i.g. to about 500 p.s.i.g. are preferably maintained in the reaction zone, and the hydrogen is preferably supplied in a molar ratio of about 2 to about 20 moles of hydrogen per mole of hydrocarbon feedstock. Conventionally, the hydrogen concentration is maintained by recycling hydrogen-rich gas from the reaction zone. The weight hourly space velocity (WHSV—weight of hydrocarbon feedstock per unit time per unit weight of catalyst) is generally in the range of about 1 to about 30, and preferably about 2 to about 15. The reforming process may be performed in a series of reaction stages; that is, a plurality of reactors or reaction zones is provided for series contact of catalyst with the feed and heaters are usually provided between the individual reactors or zones to assure the proper reaction temperature.

The present method is applicable for determining decreases in hydrogenation-dehydrogenation activity and acidic activity of conventional catalysts comprising platinum-alumina, such as conventional hydrocarbon reforming catalysts. Although these catalysts may generically be defined as comprising platinum-alumina it is understood that this generic terminology includes catalysts which comprise one or more of the platinum metals of Group VIII, preferably platinum, palladium, rhodium or iridium. The platinum component generally comprises from about 0.05% to about 3.0%, preferably from about 0.05% to about 1.0%, by weight of the catalyst calculated on an elemental basis. The alumina component of the catalyst may be gamma-, eta- or theta-alumina or mixtures thereof. The alumina component normally comprises a major proportion, preferably at least about 80%, more preferably at least about 90%, by weight of the catalyst. The catalyst may also contain metals such as rhenium, germanium, tin and the rare earth metals which are conventionally used in reforming catalysts. The catalyst may, of course, include other components, such as certain halogens and halogenated compounds, which are known to have a beneficial effect on the activity of platinum-alumina catalysts.

When the method of the present invention indicates a decrease in hydrogenation-dehydrogenation and/or acidic activity, the catalyst may be regenerated in any manner known to restore the catalytic activity. Regeneration of reforming catalysts is well known to the art and is the subject of many patents, including U.S. Pats. 2,956,611 and 2,922,766. In essence, catalyst regeneration involves passing a gas stream of limited oxygen concentration over the catalyst at controlled temperatures to burn the carbonaceous deposits on the catalyst. Before the feedstock is reintroduced into the reaction zone, the catalyst may be treated with halogenated compounds such as those previously noted to enhance the activity of the regenerated catalyst.

Various step(s) of the method of the present invention are to be repeated periodically, e.g., normally about once a week. These steps may be repeated more frequently toward the end of a cycle, i.e., the on-stream time which, from experience, is normally expected to pass between catalyst regenerations or replacements.

The following examples will more clearly identify the method of this invention. However, these examples are not to be interpreted as specific limitations on this invention.

EXAMPLE 1

This example illustrates a calculation procedure which may be used to obtain the baseline molar concentration ratio of toluene to methylcyclohexane.

The terminal reactor of a conventional hydrocarbon reformer which utilizes a platinum-alumina catalyst to process 8000 barrels per day of naphtha into high octane gasoline, was operated at the following conditions:

Reactor outlet temperature _____ 917° F. (1376° R.).
Reactor outlet pressure _____ 417 p.s.i.g.
Analysis of reactor
Effluent, mole percent:
  $H_2$ _____ 77.6.
  $C_1$-$C_4$ _____ 12.0
  $C_5+$ _____ 10.4

The hydrogen partial pressure is calculated as follows:

$$\frac{77.6}{100} \times (417+14.7) = 335 \text{ p.s.i.a.}$$

Baseline molar concentration ratio of toluene to methylcyclohexane is calculated as follows:

$$\log_{10}\left(\frac{\text{Toluene}}{\text{Methylcyclohexane}}\right) = 20.1896 - \frac{19064}{1376}$$

$$-\frac{1.1954 \times 10^6}{(1376)^2} + \frac{4.394 \times 10^8}{(1376)^3} - 3\log_{10}\left(\frac{335}{14.7}\right)$$

$$\left(\frac{\text{Toluene}}{\text{MCH}}\right) = \frac{7.45 \times 10^5}{(335/14.7)^3} = 63$$

Gas chromatography was used to analyze the reactor effluent to determine the actual or observed molar ratio of toluene to methylcyclohexane. This ratio was calculated at 111. The activity ratio was calculated at 111/63 or 1.76, indicating that the platinum-alumina catalyst has a reasonable amount of hydrogenation-dehydrogenation activity.

EXAMPLE 2

This example illustrates the use of the method of the present invention in indicating a decrease in hydrogenation-dehydrogenation catalytic activity.

A platinum-alumina catalyst, after regeneration, was put into commercial naphtha reforming service (to convert naphtha into high octane gasoline) and after one week, the reactor effluent was partially analyzed, by gas chromatography to determine the molar ratio of toluene to methylcyclohexane present in the reactor effluent. The results of this analysis were used to calculate an activity ratio in a manner similar to that illustrated in Example 1. The tabulation below includes the $C_5+$ volume percent yield (based on the hydrocarbon feedstock) obtained by a material balance around the commercial unit one week after the catalyst was put into service are given below.

Time, after cat. regen. (week) _____ 1
Toluene MCH:
  Actual _____ 84
  Theoretical _____ 44
Activity ratio _____ 1.9
$C_5+$ yield _____ 85.8

These results indicate that the catalyst regeneration had left the catalyst with acceptable hydrogenation-dehydrogenation activity.

However, about four weeks after the original analysis, the following results were obtained.

Time, after cat. regen. (weeks) _____ 5
Toluene MCH:
  Actual _____ 75
  Theoretical _____ 95
Activity ratio _____ 0.8
$C_5+$ yield _____ 86.4

These results indicate that a decrease in hydrogenation-dehydrogenation catalytic activity had occurred. Note that the above yield data are insensitive to this decrease in the hydrogenation-dehydrogenation activity of the catalyst.

The catalyst was subsequently taken out of naphtha reforming service and regenerated to remove carbonaceous material which had deposited on the catalyst and reactivate the catalyst. Upon being placed back in reforming service, the hydrocarbon effluent was analyzed and the following results were obtained:

Time, after cat. regen. (week) _____ 1
Toluene MCH:
  Actual _____ 103
  Theoretical _____ 55
Activity ratio _____ 1.9
$C_5+$ yield _____ 92.2

These results indicate that the regeneration was successful in restoring the hydrogenation-dehydrogenation activity of the catalyst.

EXAMPLE 3

This example illustrates the use of the method of the present invention in indicating a decrease in the acidic activity of a platinum-alumina catalyst.

A platinum-alumina catalyst, having acceptable hydrogenation-dehydrogenation activity, was placed into naphta reforming service. After two days, the reactor effluent was partially analyzed, by gas chromatography, to determine the molar ratios of n-hexane to 2,2-dimethylbutane, and n-heptane to 3,3-dimethylpentane present in the reactor effluent. These molar ratios, which serve as the baseline isomer ratios for the determination of acidic activity decrease, were as follows:

Time on stream (days) _____ 2
n-Hexane 2,2-$DMC_4$ _____ 3.7
n-Heptane 3,3-$DMC_5$ _____ 10

After four months on stream, the following paraffin molar ratios were obtained;

Time on stream (months) _____ 4
n-Hexane 2,2-DMC$_4$ _____ 7.7
n-Heptane 3,3-DMC$_5$ _____ 18

Also, after four months on stream, it was determined that the activity ratio was greater than 1.8 and, therefore, the catalyst had acceptable hydrogenation-dehydrogenation activity. As a result, the above paraffin isomer ratios indicated that a decrease in the acidic activity of the platinum-alumina catalyst had occurred after four months in naphtha reforming service.

While in the foregoing disclosure certain examples have been set forth which illustrate details specifying modes of applying this invention, it should be understood that such details may be varied considerably by one skilled in the art without departing from the spirit of this invention.

The embodiments of the invention in which an exclusive property or privilege is claimed are defined as follows:

1. A method for determining a decrease in the hydrogenation-dehydrogenation activity of a catalyst comprising platinum and alumina, said catalyst being used in at least one reaction zone to catalyze the chemical conversion of hydrocarbon feedstock to hydrocarbon effluent in the presence of hydrogen at hydrocarbon conversion conditions, said hydrocarbon effluent containing toluene and methylcyclohexane, said method comprising:
   (1) analyzing said effluent from said reaction zone to determine the actual molar ratio of toluene to methylcyclohexane in said effluent;
   (2) determining an activity ratio, said activity ratio being the ratio of said actual ratio to the baseline molar ratio of toluene to methylcyclohexane at the conditions of temperature and hydrogen partial pressure existing at the outlet of said reaction zone, said baseline molar ratio being defined as $$\log_{10}\left(\frac{\text{Toluene}}{\text{Methylcyclohexane}}\right) = 20.1896 - \frac{19064}{T}$$
$$- \frac{1.1954 \times 10^6}{T^2} + \frac{4.394 \times 10^8}{T^3} - 3\log_{10} P_{H_2}$$

wherein T is the temperature at the outlet of said reaction zone in ° Rankine and $P_{H_2}$ is the hydrogen partial pressure at the outlet of said reaction zone in atmospheres; and
   (3) repeating steps (1) and (2) periodically until said activity ratio is determined to be less than about 1.7, said determination indicating a decrease in the hydrogenation-dehydrogenation activity of said catalyst.

2. The method of claim 1 wherein steps (1) and (2) are repeated until said activity ratio is determined to be less than about 1.3.

3. The method of claim 1 wherein steps (1) and (2) are repeated until said activity ratio is determined to be less than about 1.0.

4. The method of claim 1 wherein said effluent is analyzed by gas chromatography.

5. The method of claim 2 wherein said effluent is analyzed by gas chromatography.

6. The method of claim 3 wherein said effluent is analyzed by gas chromatography.

7. A method for determining a decrease in the acidic activity of a catalyst comprising platinum and alumina having acceptable hydrogenation-dehydrogenation activity, said catalyst being used in at least one reaction zone to catalyze the chemical conversion of hydrocarbon feedstocks to hydrocarbon effluent in the presence of hydrogen at hydrocarbon conversion conditions, said hydrocarbon effluent containing at least one set of paraffins selected from the group consisting of (A) n-hexane and 2,2-dimethylbutane and (B) n-heptane and 3,3-dimethylpentane, said method comprising:
   (1) analyzing said effluent from said reaction zone to enable the determination of a baseline isomer concentration ratio, said isomer ratio selected from the group consisting of n-hexane to 2,2-dimethylbutane and n-heptane to 3,3-dimethylpentane, provided that both components making up said ratio are present in said effluent;
   (2) analyzing said effluent from said reaction zone to enable determination of a current isomer concentration ratio; and
   (3) repeating step (2) until said current ratio is determined to be at least about 1.3 times said baseline ratio, said determination indicating a decrease in the acidic activity of said catalyst.

8. The method of claim 7 wherein step (2) is repeated until said current ratio is determined to be at least about 1.5 times said baseline ratio.

9. The method of claim 7 wherein step (2) is repeated until said current ratio is determined to be at least about 2.0 times said baseline ratio.

10. The method of claim 7 wherein said effluent is analyzed by gas chromatography.

11. The method of claim 8 wherein said effluent is analyzed by gas chromatography and said baseline isomer concentration ratio is determined within about one month of the start-of-the-catalyst-cycle.

12. The method of claim 9 wherein said effluent is analyzed by gas chromatography and said baseline isomer concentration ratio is determined within about one week of the start-of-the-catalyst-cycle.

13. In a method for catalytically reforming a hydrocarbon feedstock to a hydrocarbon effluent using a catalyst comprising platinum and alumina in at least one reaction zone in the presence of hydrogen at hydrocarbon reforming conditions, said hydrocarbon effluent containing toluene and methylcyclohexane, the improvement comprising determining a decrease in the hydrogenation-dehydrogenation activity of said catalyst by the method of claim 1.

14. In a method for catalytically reforming a hydrocarbon feedstock to a hydrocarbon effluent using a catalyst comprising platinum and alumina in at least one reaction zone in the presence of hydrogen at hydrocarbon reforming conditions, said hydrocarbon effluent containing toluene and methylcyclohexane, the improvement comprising determining a decrease in the hydrogenation-dehydrogenation activity of said catalyst by the method of claim 3.

15. In a method for catalytically reforming a hydrocarbon feedstock to a hydrocarbon effluent using a catalyst comprising platinum and alumina in at least one reaction zone in the presence of hydrogen at hydrocarbon reforming conditions, said conditions comprising temperatures in the range from about 800° F. to about 1000° F., pressure in the range from about 150 p.s.i.g. to about 500 p.s.i.g., hydrogen to hydrocarbon feedstock molar ratio in the range from about 2 to about 20 and a WHSV in the range from about 1 to about 30, said hydrocarbon effluent containing toluene and methylcyclohexane, the improvement comprising determining a decrease in the hydrogenation-dehydrogenation activity of said catalyst by the method of claim 6.

16. In a method for catalytically reforming a hydrocarbon feedstock to a hydrocarbon effluent using a catalyst comprising platinum and alumina in at least one reaction zone in the presence of hydrogen and hydrocarbon reforming conditions said hydrocarbon effluent containing at least one set of paraffins selected from the group consisting of (A) n-hexane and 2,2-dimethylbutane and (B) n-heptane and 3,3-dimethylpentane, the improvement comprising determining a decrease in the acidic activity of said catalyst by the method of claim 7.

17. In a method for catalytically reforming a hydrocarbon feedstock to a hydrocarbon effluent using a catalyst comprising platinum and alumina in at least one reaction zone in the presence of hydrogen and hydrocarbon reforming conditions said hydrocarbon effluent containing at least one set of paraffins selected from the group consisting of (A) n-hexane and 2,2-dimethylbutane and (B) n-heptane and 3,3-dimethylpentane, the improvement comprising determining a decrease in the acidic activity of said catalyst by the method of claim 9.

18. In a method for catalytically reforming a hydrocarbon feedstock to a hydrocarbon effluent using a catalyst comprising platinum and alumina in at least one reaction zone in the presence of hydrogen at hydrocarbon reforming conditions, said conditions comprising temperatures in the range from about 800° F. to about 1000° F., pressure in the range from about 150 p.s.i.g. to about 500 p.s.i.g., hydrogen to hydrocarbon feedstock molar ratio in the range from about 2 to about 20 and a WHSV in the range from about 1 to about 30, said hydrocarbon effluent containing at least one set of paraffins selected from the group consisting of (A) n-hexane and 2,2-dimethylbutane and (B) n-heptane and 3,3-dimethylpentane, the improvement comprising determining a decrease in the acidic activity of said catalyst by the method of claim 12.

19. The method of claim 15 wherein said catalyst is regenerated after a decrease in the hydrogenation-dehydrogenation activity of said catalyst is determined.

20. The method of claim 18 wherein after a decrease in the acidic activity of said catalyst is determined at least one halogenated hydrocarbon is added to said feedstock to increase the acidic activity of said catalyst.

References Cited
UNITED STATES PATENTS

| | | | |
|---|---|---|---|
| 2,689,208 | 9/1954 | Murray et al. | 196—50 |
| 2,999,805 | 9/1961 | Myers | 208—140 |
| 3,267,026 | 8/1966 | Decker | 208—140 |

DELBERT E. GANTZ, Primary Examiner

S. L. BERGER, Assistant Examiner

U.S. Cl. X.R.

208—138, 140, DIG. 1